US005942129A

United States Patent [19]

Hayes

[11] Patent Number: 5,942,129

[45] Date of Patent: Aug. 24, 1999

[54] CYTOLOGY CHAMBER WITH SEPARATE LEG FOR FIXATIVE

[75] Inventor: William J. Hayes, Edgeworth, Pa.

[73] Assignee: Shandon, Inc., Pittsburgh, Pa.

[21] Appl. No.: 08/895,669

[22] Filed: Jul. 17, 1997

[51] Int. Cl.[6] .................................................... B01D 33/15

[52] U.S. Cl. .......................... 210/781; 210/782; 210/361; 422/72; 422/101; 436/45; 436/177

[58] Field of Search .................................... 210/781, 782, 210/361; 422/72, 101; 436/177, 45

[56] References Cited

U.S. PATENT DOCUMENTS

| | | | |
|---|---|---|---|
| 4,391,710 | 7/1983 | Gordon | 210/361 |
| 4,678,579 | 7/1987 | Griffin | 210/477 |
| 4,705,630 | 11/1987 | Gordon et al. | 210/361 |
| 4,853,188 | 8/1989 | Toga | 422/104 |
| 5,252,228 | 10/1993 | Stokes et al. | 210/781 |

*Primary Examiner*—David A. Reifsnyder
*Attorney, Agent, or Firm*—John E. Reilly

[57] ABSTRACT

There is provided an apparatus and method for using a centrifuge to apply a treatment liquid, such as a fixative agent, to a specimen undergoing centrifugation analysis. There is provided a centrifuge sample chamber with a mounting flange for engagement with a microscope slide, so that specimen material is centrifuged to the slide for inspection. The sample chamber has an upper cavity and a lower specimen holding portion which are connected by a fluid passage. The specimen holding portion ideally includes a lower cavity with a lower leg extending down therefrom for holding the specimen prior to centrifugation. An upper hollow leg in communication with the upper cavity holds the treatment liquid while the chamber is at rest prior to centrifugation. Activation of the centrifuge tilts the chamber to incline the upper and lower legs, so that the treatment liquid flows into, and is held within, the upper cavity by centrifugal force. Centrifugal forces simultaneously cause the specimen to flow out of the lower leg, through the lower cavity and through a discharge port, and to the microscope slide. Upon deactivation of the centrifuge, the chamber tilts by gravity back to the rest position, allowing the treatment liquid to fall by gravity from the upper cavity, through the passage, and into the lower leg. Reactivation of the centrifuge again tilts the chamber to incline the lower leg, and centrifugal forces cause the treatment liquid to flow out of the lower leg and through the discharge port for centrifugal application to the specimen on the microscope slide. The invention thus minimizes the amount of specimen and slide manipulation required reliably to apply a treatment liquid, such as a fixative, to a centrifuged specimen.

25 Claims, 1 Drawing Sheet

CYTOLOGY CHAMBER WITH SEPARATE LEG FOR FIXATIVE

BACKGROUND AND FIELD OF THE INVENTION

The invention relates to centrifugation methods and apparatus, and more particularly to a novel and improved method and device for containing and applying a fixative agent or other treatment liquid to a specimen to be centrifuged.

Medical diagnostic processes commonly include collecting biological material specimens from patients for laboratory analysis. Biological materials subject to collection and analysis include, but are not limited to, blood, saliva, urine, epithelial smears, semen, and the like. Laboratory analysis of collected biological material frequently involves the use of a cytocentrifuge for separating fluid samples into various constituent components. A general description of the centrifugation process, and a suitable apparatus for accomplishing centrifugation of biological specimens, is contained in U.S. Pat. No. 4,705,630 to Hayes, assigned to the assignee of this invention, the disclosure of which is hereby incorporated by reference. Other background references providing details of cytocentrifuge construction and operation, and some of the advantages and disadvantages presented in the art, include U.S. Pat. No. 4,853,188 to Toya, No. 4,678,579 to Griffin, and No. 4,391,710 to Gordon, the respective disclosures of which also are incorporated by reference. Typically, the centrifuge is used to separate the specimen components, and force at least a portion of the specimen through a filter and onto a microscope slide for analysis.

After the specimen has been centrifuged onto the microscope slide, it often must be treated with chemicals, such, as fixative or preservative agents, dyes and the like. The current common practice is to place the specimen into the sample chamber and the chamber into the centrifuge, operate the centrifuge, and then remove the chamber from the centrifuge and/or open the chamber in order to access the specimen to apply the treatment liquid. This conventional manner of applying a treatment chemical to the specimen is time consuming and fraught with opportunity for sample contamination.

The present invention fills an unmet need for a simple, inexpensive, and convenient method and apparatus for applying a treatment liquid, such as a fixative agent, to a specimen immediately after centrifugation. While the present invention finds particularly beneficial use in cytocentrifuges for the analysis of biological materials specimens, one of ordinary skill in the art will readily appreciate that the invention has utility in the general art of centrifugation.

SUMMARY OF THE INVENTION

The invention relates to a novel and improved method and apparatus for containing and applying a fixative agent or other treatment liquid to a specimen being processed in a centrifuge. The inventive apparatus is a sample chamber having a hollow upper leg in fluid connection with an upper cavity. The upper cavity is in fluid connection with a lower holding portion. The lower holding portion in turn is in fluid communication with a discharge opening in the chamber, through which specimen material may be centrifuged upon a microscope slide. The chamber is mountable in a centrifuge using a known holder, whereby the chamber is tiltable between two positions, a rest position wherein the upper leg is substantially vertical to hold and contain the treatment liquid, and a second position wherein the spinning action of the centrifuge results in an inertial force that tips the chamber to a second position where the upper leg is inclined from the vertical. In practice, the treatment liquid is placed in the upper leg and the specimen is deposited in the holding portion while the centrifuge is at rest and the chamber is in the first position. The centrifuge is activated to tip the chamber to the second position, so that the specimen flows by centrifugal force to the microscope slide, while the treatment liquid flows by centrifugal force out of the inclined upper leg and into the upper cavity. Once the specimen has been centrifugally deposited upon the microscope slide, the centrifuge is deactivated. The chamber returns by gravity to its rest position, and the treatment liquid falls from the upper cavity into the lower holding portion. The centrifuge is then reactivated to force the treatment liquid out of the holding portion, through the discharge opening, and onto the specimen to fix the specimen to the slide, eliminating the need to handle the slide separately to apply the treatment liquid.

An object of the invention is to provide a novel and improved centrifugation system, and method for using same, to automatically apply a fixative or other treatment liquid to a specimen that has been processed in a centrifuge.

Another object of the invention is to provide for automatic and successive application of a specimen and a treatment liquid such as a fixative agent onto a specimen slide without the necessity of manipulating the slide.

In accordance with the present invention, there is provided a system for use in centrifuging a specimen onto a microscope slide or other collection surface, the system comprising separate but adjoining specimen and treatment liquid holding portions in a common chamber, a discharge opening in communication with the specimen holding portion, and centrifuge means for spinning the chamber whereby to cause successive advancement of the specimen and treatment liquid through the discharge opening onto the slide. Preferably, the holding portions are of vertical elongated configuration with a common partition therebetween and an upper cavity for temporarily retaining the fixative or other treatment liquid in a manner to be described.

Also in accordance with the present invention, there is provided a method of successively applying liquid materials onto a collection surface for analysis, comprising mounting a chamber having plural liquid holding portions on a centrifuge, placing each of said liquids in a different one of said liquid holding portions, and spinning said chamber to successively advance said liquids from each of their respective liquid holding portions. Preferably, the liquid holding portions are disposed in radially inner and outer relation to the axis of the centrifuge and the liquids are successively transferred from the radially outer holding portion and radially inner holding portion. Further, an intermediate receiving portion may be interposed between the radially inner and outer holding portions so that the liquid from the inner holding portion is first transferred into the intermediate holding portion in an initial spinning operation for transferring the liquid from the outer holding portion onto the collection surface, followed by deactivation of the centrifuge to permit the liquid from the intermediate holding portion to fall into the outer holding portion, and thereafter spinning again the centrifuge to transfer the liquid from the outer receiving portion onto the collection surface.

The above and other objects of the present invention will become more readily appreciated and understood from a consideration of the following detailed description of preferred and modified forms of the present invention when taken together with the accompanying drawings in which:

DETAILED DESCRIPTION OF A PREFERRED EMBODIMENT

The invention relates to a method and apparatus for containing and applying a fixative agent or other treatment liquid to a centrifuged specimen. In this specification and in the claims, "treatment liquid" means and includes any chemical substance desired to be applied to a specimen in association with or immediately after centrifugation, and particularly includes without limitation fixative agents and preservatives. "Specimen" means the material sample subject to centrifugation, particularly biological material samples such as human or animal body fluids or cellular suspensions, but also potentially including non-biological chemical or geological samples as well. The invention is directed to a means and method for quickly and cleanly applying a treatment liquid to a centrifuged sample with minimal handling of the specimen or sample chamber.

Figure 1:
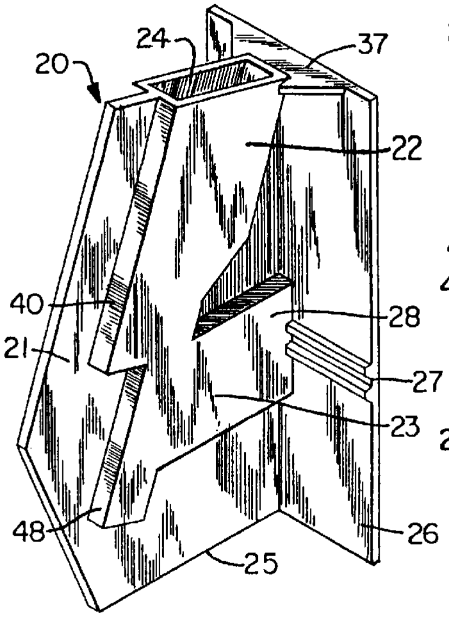
FIG. 1 is a perspective view of a preferred embodiment of the chamber of the invention.
Figure 2:
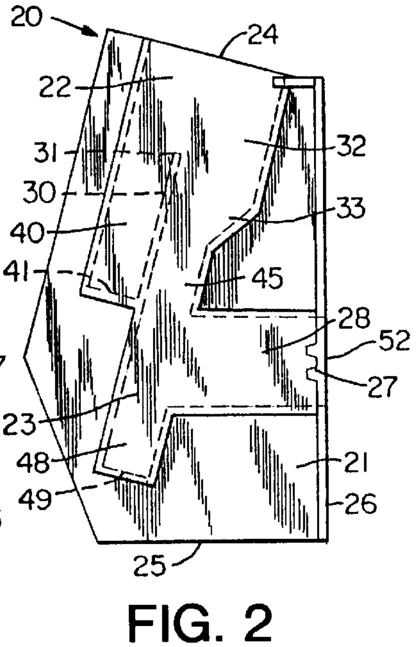
FIG. 2 is a side view in elevation of the chamber shown in FIG. 1.

FIG. 1 illustrates that a preferred form of the invention broadly comprises a cytology chamber 20 for receiving and holding a liquid sample of biological material, such as urine or an epithelial sample suspended in a solution. The sample chamber 20 preferably is a unitary body having an upper cavity 22, a first holding portion 40 and a second holding portion 23 defined in major part by a pair of spaced apart, preferably parallel sidewalls 25, 25' and also by a plurality of specially configured, narrow front walls 29, 29', 29" and back walls 35, 35' integrated with a main body flange 21. The second, lower holding portion 23 also is defined in part by preferably parallel spaced top wall 38 and bottom wall 42. The chamber 20 preferably is molded from a plastic inert to conventional biological material samples, solutions, and treatment agents. Reference to FIG. 2 further shows that the upper cavity 22 is offset from the holding portion 23, and that a wall 30 defines a partition between the first, upper holding portion 40 and the second, lower holding portion 23. The wall 30 also separates the upper holding portion 40 from the upper cavity 22 and from a passage 45 which defines a constricted portion connecting the upper cavity 22 with the holding portion 23. The holding portion 23 terminates in a lower leg 48 extending downwardly beyond a lower cavity 28 which is in fluid communication with the passage 45. The upper cavity 22 of chamber 20 is supplied with an open entrance or mouth 24 through which materials may be passed into the upper cavity 22 and thence into the upper and lower legs 40, 48.

Figure 3:
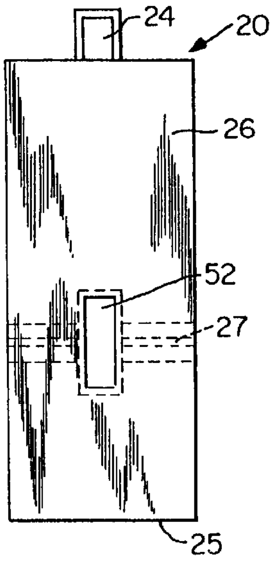
FIG. 3 is a front view of the chamber shown in FIG. 1.

As best seen in FIG. 1, the cavities 22, 28, the legs 40, 48 and the passage 45 are all formed from or in a body 21 which adds rigidity to, and aids the manipulation of, the complete chamber 20. A mounting flange 26 preferably is integrally molded perpendicularly to the body 21. Mounting flange 26 is used to releasably mount the chamber 20 on a centrifuge. In this disclosure and in the claims, "up," "top," "above," "down," "bottom," and "below" shall have their ordinary meanings with reference to the chamber 20 as oriented in FIGS. 1–3, i.e., with the open mouth 24 facing generally upward and with the mounting flange 26 very generally vertical. "Front" or "forward" refers to a direction toward the mounting flange 26, that is, toward the right in FIG. 2. "Back" or "rear" means a direction away from the mounting flange 26, i.e., toward the left in FIG. 2. Gravity therefor tends to pull fluids downward toward the bottom 25 of the chamber 20, while inertial forces during centrifugation tend to pull fluids forward toward the mounting flange 26, as further explained herein.

The body 21 comprises a body flange in which is formed the upper cavity 22 and the holding portions 23, 40. Hollow first or upper holding portion 40 extends downwardly from the upper cavity 22 and has walls and a bottom 41 for holding a fixative agent or other treatment liquid so that in the preferred embodiment the upper holding portion is a first or upper leg. This upper leg 40 has an upper end opening into the upper cavity 22, so that there is fluid communication between the upper leg 40 and the upper cavity 22. The lower, second hollow leg 48 is offset from and below the upper hollow leg 40 and likewise has walls and solid bottom 49 for holding a liquid. In the preferred embodiment, the upper leg 40 is deeper than the lower leg 48. The upper leg 40 and the lower leg 48 preferably are both generally square or rectangular in sectional shape, but alternatively may be cylindrical, or some other cross-sectional shape. Most preferably, each of the legs 40 and 48, and the passage 45 are symmetrical about their respective longitudinal axes. The fluid passage 45 is a steep tunnel between the upper leg 40 and the mounting flange 26, and is in fluid communication with the upper cavity 22 and the holding portion 23 comprised of the lower cavity 28 and lower leg 48. Passage 45 serves both as an access for depositing the specimen in the lower leg 48 and as a conduit through which treatment liquid may fall by gravity from the upper cavity 22 to the holding portion 23. The passage 45 and the lower leg 48 preferably have a common longitudinal axis which is parallel to and in front of the axis of the upper leg 40.

The upper cavity 22 features a retention cove 32 defined between the open mouth 24 and a lower constricted portion 33 adjacent to and in fluid communication with the passage 45. The retention cove 32 is a niche in the upper cavity 22, interposed between the upper and lower holding portions 23, 40, and forming an intermediate holding portion in which the treatment liquid is held by centrifugal force during centrifugation. The constricted portion 33, in cooperation with centrifugal force, maintains the treatment liquid within the cove 32 within upper cavity 22, and above the lower cavity 28 during a certain duration of the centrifugation, as shall be explained.

The separation wall 30 isolates the upper leg 40 from the fluid passage 45 connecting the upper cavity 22 with the lower cavity 28. Notably, the upper cavity 22 extends downwardly below the top edge 31 of the separation wall 30 so that the wall 30 effectively divides the upper leg 40 from the constricted portion 33 of the upper cavity 22. Accordingly, the upper leg 40 and the passage 45 have upper ends in separate fluid communication with the upper cavity 22.

Figure 4:
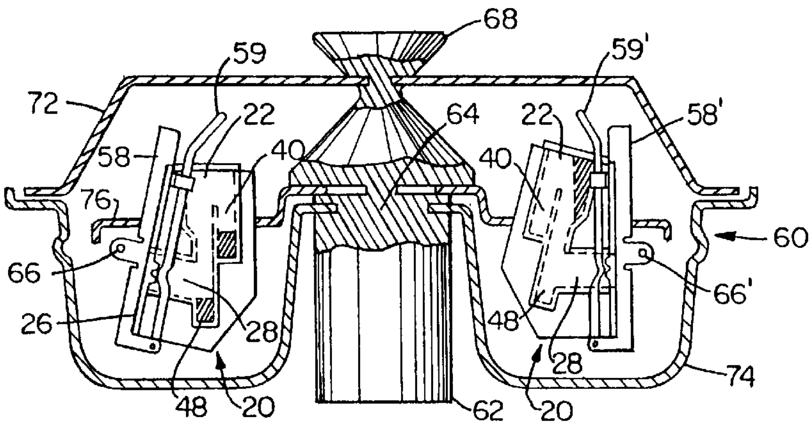
FIG. 4 is a partial sectional view of a cytocentrifuge with two chambers according to the invention disposed therein, the left-hand chamber shown in a condition prior to the first instance of centrifugation and the right-hand chamber shown in a condition during the first instance of centrifugation.
Figure 5:
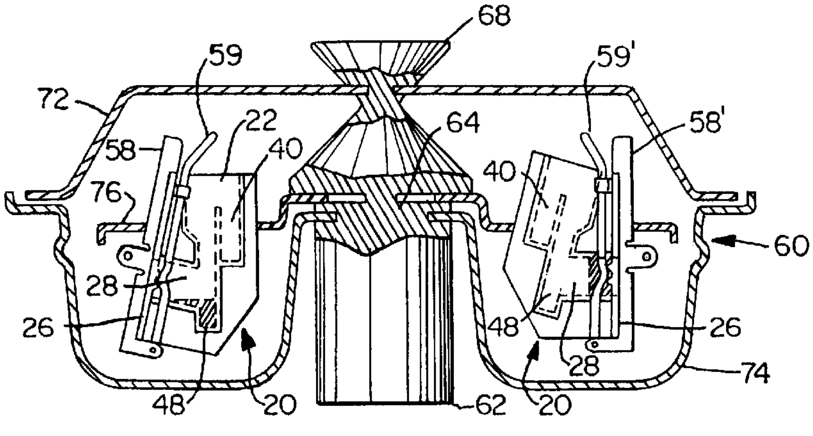
FIG. 5 is another partial sectional view of the cytocentrifuge shown in FIG. 4, with the two chambers according to the invention disposed therein, the left-hand chamber shown in a condition immediately after the first instance of centrifugation and the right-hand chamber shown in a condition during the second instance of centrifugation.

The sample chamber 20 is utilize in a centrifuge such as that shown in FIGS. 4 and 5. The cytocentrifuge described in U.S. Pat. No. 4,705,630 may be readily adapted for use of the chamber 20 of the present invention, and reference to the ’630 patent supplies additional useful detail. Referring to FIGS. 4 and 5, the centrifuge 60 carries a vertically mounted centrifuge motor 62 with a vertically oriented spindle 64. A sealed centrifuge head 68 rides on the end of the motor spindle 64. The head 68 is removable when the centrifuge is at rest. An access cover and lower housing (not shown) typically enclose the rotating parts to protect the user during operation. The head 68 has a removable top 72 and an annular, bowl-shaped bottom 74. The head 68 typically contains an even number (two shown in FIGS. 4 and 5) of chamber holders 58, 58' spaced symmetrically about the centrifuge spindle axis in a carrier plate 76. The holders 58, 58' are mostly conventional in design, and may be substantially similar to the holders disclosed in U.S. Pat. No. 4,705,630. The bottom 74 has a central hub 78 which supports the carrier plate 76 in turn positioning the holders 58, 58' symmetrically around the inside of the annular bottom 74. When the top 72 is installed on the bottom, all of the holders 58, 58' are completely sealed inside. A sample chamber 20 containing a biological specimen to be analyzed is removably mounted upon each holder 58, 58' by means of pivotal holder clips 59, 59'. The head 68 can then be installed on the spindle 74 in the centrifuge 60 for centrifugal operation in which the entire head 68 is rotated.

Referring again to FIGS. 1–3, the sample chamber 20 features a mounting flange 26 connected to the body flange 21, the flange 26 made up of a flat rigid strip of plastic having length and width dimensions approximately equaling the corresponding dimensions of a conventional microscope slide. The mounting flange 26 supports the body 21 while the chamber 20 is within the centrifuge 60, and provides a surface against which a clip or clamp on the holder 58, 58' presses to hold the chamber 20 against the microscope slide (not shown) and in position within the centrifuge. A clip groove 27 may be provided upon the back side of the flange 26 to promote a secure engagement of the holder clips 59, 59' against the flange 26. The flange 26 has a discharge opening 52 therethrough from the lower cavity 28.

The mounting flange 26 and the body flange 21 preferably are integrally joined along their height in mutually perpendicular relation. A gusset 37 optionally may be provided to reinforce an inflexible connection between the mounting flange 26 and the body flange 21. In the preferred embodiment, when the chamber 20 is upright with the mounting flange 26 substantially vertical, the upper leg 40, the lower leg 48, and the passage 45 are inclined somewhat from the vertical. The longitudinal axes of the upper leg 40, lower leg 48 and the passage 45 are tilted to be obliquely disposed in relation to the mounting flange 26, so that the open tops of the legs 40, 48 are closer to the mounting flange 26 than are the leg bottoms 41, 49. Accordingly, when the chamber 20 is mounted within the centrifuge 60, the lower leg 23 and the upper leg 40 are in outer and inner radial relation, respectively, to the axis of rotation of the centrifuge 60. Most preferably, but not necessarily, the respective axes of the two legs 40, 48 are substantially parallel.

The obliquely inclined disposition of the legs 40, 48 promotes the proper functioning of the inventive chamber 20 during the centrifugation process. When the chamber 20 is in a position with the top of the mounting flange 26 tipped radially inward within the centrifuge 60, the axes of the legs 40, 48 are substantially vertical so as to maximize their ability to contain a liquid. When the chamber 20 is tilted to another position, as by the centrifugal force in a spinning centrifuge, to bring the mounting flange 26 to the vertical position seen in FIG. 2, the legs 40, 48 are inclined from the vertical to reduce their effectiveness at containing a liquid. In the invention, the chamber 20 has the position shown in FIG. 2 when the centrifuge 60 is activated, and the open tops of the legs 40, 48 are inclined radially outward from the centrifuge spindle 64. Consequently, the centrifugal forces of the spinning centrifuge impel the liquids contained in the legs 40, 48 to flow upwardly and radially outwardly along the front walls of the legs, and to flow into the upper 22 and lower 28 cavities, respectively.

The lower cavity 28 preferably comprises a generally rectangular, comparatively large tunnel extending from the lower leg 48 to the discharge opening 52. Discharge opening 52 is an orifice generally centrally through the mounting flange 26 to permit the flow of sample material from the lower leg 48 and lower cavity 28 through the flange 26 and to the microscope slide (not shown) during centrifugation, so that the lower leg 48 effectively is in fluid communication with the discharge opening 52.

Reference again is made to FIGS. 4 and 5. The chamber 20 with gasket (not shown) and filter card (not shown) attached is releasably installed for use within a cytocentrifuge in a conventional manner, for example as explained in U.S. Pat. No. 4,705,630. The empty chambers 20 are assembled to a microscope slide each with a filter card between the mounting flange 26 and the microscope slide, and the entire assembly then clamped to the holders 58, 58' by means of clips 59, 59'. The empty chambers 20 are placed into the carrier 76 in the bottom of the head 68. A specimen is then deposited in each lower leg 48 of the holding portion 23, and a treatment liquid is placed in each first leg 40, using a pipette or some other specimen transfer device.

The holders 58, 58' are pivotal on horizontal pins or shafts 66, 66' and undergo arcuate movement about the pins in response to gravitational and inertial forces. The holders 58, 58' are disposed vertically eccentrically or asymmetrically upon the horizontal pins 66, 66', so that the spinning of the centrifuge 60 in operation exerts unbalanced inertial forces upon the holders 58, 58', causing them to rotate or tip upon their pins. Accordingly, chambers 20 releasably attached to the holders 58, 58' likewise are tiltable in response to gravity and inertia. Specifically, the chamber 20 is tiltable between a first position when the centrifuge 60 is at rest and a second position when the centrifuge is activated. The left-hand chambers 20 in each of FIGS. 4 and 5 are shown in this first “rest” position, with the holders 58 and mounting plates 26 inclined from vertical by the force of gravity. The right-hand chambers 20 illustrated in FIGS. 4 and 5 are in the second position, wherein the activation of the centrifuge 60 spins the carrier 76 to cause centrifugal forces on the holders 58' which tips them, and the mounting plate 26, to a substantially vertical position.

A method of practicing the invention is briefly described. Very broadly characterized, the invention includes the process of using a sample chamber for applying by centrifugation a treatment liquid to a specimen within a centrifuge. This is accomplished by holding by gravity the treatment liquid separately from the specimen when the chamber 20 is in the first position, as depicted by the left-hand chamber 20 in FIG. 4, holding the treatment liquid above the holding portion 23 when the chamber 20 is in the second position while the centrifuge 60 is activated, as depicted by the right-hand chamber 20 in FIG. 4, and then allowing the treatment liquid to fall by gravity into the holding portion 23 when the chamber 20 returns to the first position after the centrifuge 60 is deactivated, as seen in the left-hand chamber 20 in FIG. 5. Upon reactivation of the centrifuge 60, the treatment liquid flows by through the discharge opening and against the microscopic slide, as indicated by the right-hand side of FIG. 5. Thus, the upper hollow leg 40 having a closed bottom 41 for holding the treatment liquid serves as a means for holding the treatment liquid separately from the specimen. The upper cavity 22, and most preferably the retention cove 32 therein, functions as a means for holding the treatment liquid above the holding portion 23 during centrifugation, and the passage 45 extending between the upper cavity 22 and the holding portion 23 is a means for allowing the treatment liquid to fall by gravity to the holding portion 23 after the specimen has been centrifuged against the microscope slide.

Practice of the invention is initiated by mounting the chamber 20 in the first position against the holder 58 in the centrifuge 60 while the centrifuge 60 is at rest. The user then places the treatment liquid in the upper leg 40 and deposits the specimen in the lower leg 48. Gravity, including the weight of the specimen and treatment liquid, holds the chamber 20 into a first position wherein the respective axes of the upper leg 40 and the lower leg 48 are generally vertically oriented. Notably, with the chamber 20 in the first position prior to activating the centrifuge 60, the treatment liquid, such as a fixative agent, is held by gravity within the upper leg 40 separately from the specimen, which is held by gravity within the container of the lower leg 48, as seen in the left side of FIG. 4. This process is repeated, of course, for the several chambers 20 disposed symmetrically about the interior of the centrifuge 60, and lids, not shown, are mounted in sealed relation to the upper ends of the chambers 20 prior to initiating the centrifuge operation.

With all the chambers 20 loaded with treatment liquid and specimens and positioned as seen on the left side of FIG. 4, the user activates the centrifuge 60. The spinning action of the centrifuge 60 generates significant centrifugal force which overrides the force of gravity upon the chambers 20 to rotate the holders 58, 58' upon their respective pins, thereby causing the chambers 20 to tip to the second position shown on the right side of FIG. 4. In the second position, the holders 58, 58' and mounting flanges 26 are substantially vertical, which disposes the legs 40, 48 in an obliquely tipped position with open upper ends facing radially outward away from the centrifuge spindle 64 and forwardly toward the discharge opening. With the chambers 20 in the second position and the centrifuge 60 activated, centrifugal force impels the treatment liquid and the specimens radially outward toward the mounting flange 26. According to the invention, the treatment liquid flows up the inclined separator wall 30, out the upper leg 40 and into the retention cove 32 above the constricted portion of the upper cavity 22, as seen on the right side of FIG. 4, so long as the centrifuge 60 remains actuated. Simultaneously, centrifugal force impels the specimen out of the lower leg 48 and the lower cavity 28 through the discharge opening 52. Thus, the centrifugation moves the specimen from the holding portion 23 and through the filter card, for distribution upon the microscope slide next to the holder 58' in a manner fairly similar to known processes.

Once the specimen has been sufficiently distributed upon the microscope slide against the holder 58', the user deactivates the centrifuge 60 to terminate its spinning rotation. As the centrifuge 60 comes to rest, apparent centrifugal forces cease, and gravity pivots the holders 58, 58' and restores the chamber 20 to the first position as shown in the left side of FIG. 5, placing the retention cove 32 above the lower leg 48 of the holding portion 23. With the centrifuge at or near complete rest, gravity becomes the paramount force acting upon the treatment liquid reposing in the retention cove 32, causing it to fall from the retention cove 32, down the passage 45, and into the lower leg 48 as seen on the left side of FIG. 5. The specimen or a major volume thereof (not seen in FIG. 5) is held upon the microscope slide by the filter card and capillary action.

After allowing the treatment liquid to flow down into the lower leg 48, the user reactivates the cytocentrifuge 60. The activation of the centrifuge a second time again tips the sample chamber 20 to the second position seen on the right side of FIG. 5, and centrifugal force likewise impels the treatment liquid from its position in the lower leg 48, toward the holder 58', and against the microscope slide, as indicated by the right side of FIG. 5. The user thus allows the treatment liquid to flow through the discharge opening 52 onto the microscope slide, where the treatment liquid comes in contact with the specimen. As the centrifuge continues to spin, the fixative agent, preservative, dye or the like covers or commingles with the specimen, resulting in the desired treatment thereof. The user then deactivates the centrifuge 60, and when the centrifuge has come to rest, the chambers 20 and microscope slides may be removed from the centrifuge 60 for further handling and analysis according to convention.

By this method, separate liquid materials, such as a fixative agent and a specimen, are successively applied onto a collection surface, typically a microscope slide, for analysis. Because the chamber 20 has plural liquid holding portions 23, 40, it is possible to place the fixative agent and the specimen in different ones of the holding portions 23, 40. Activating the centrifuge 60 to spin the chamber 20 successively advances the liquids from each of their respective liquid holding portions, 23, 40. As the liquid holding portions 23, 40 are disposed in radially inner and outer relation to the spindle 64 of the centrifuge 60 , centrifugal force readily transfers the liquids successively from the lower holding portion 23 and upper holding portion 40. Further, the intermediate retention cove 32 is between the holding portions 23, 40 so that the treatment liquid from the inner, upper holding portion 40 is first transferred into the retention cove 32 in the initial spinning operation, the same operation which transfers the specimen from the outer, lower holding portion 23 onto the slide. Again, because the holding portions 23, 40 are radially offset from each other, the retention cove 32 can be placed generally above the lower holding portion 23, so that deactivation of the centrifuge 60 permits the treatment liquid to fall from the intermediate cove 48 into the lower holding portion 32. Thereafter spinning again the centrifuge 60 transfers the treatment liquid from the outer, lower portion 23 onto the slide collection surface.

It is seen therefore, that an advantage of the invention is the reliable, uniform, centrifugal application of a treatment liquid upon a specimen while in situ within the centrifuge 60. Obviated is the need to open the centrifuge 60 and manipulate, and possibly contaminate, the chamber 20 and specimen to apply a chemical treatment. In all preferred embodiments of the invention, the chamber 20 preferably is molded from an inexpensive inert plastic. Inexpensive plastic composition allows the chamber 20 to be discarded after a single use.

It is therefore to be understood that while preferred forms and methods of the invention have been herein set forth and described, various modification and changes may be made in the construction and arrangement of parts, composition of materials, and order of steps without departing from the spirit and scope of the present invention as defined by the appended claims.

What is claimed is:

1. A system for use in centrifuging a specimen and a treatment liquid onto a collection surface, the system comprising:

a cytology chamber having radially inner and outer specimen and treatment liquid holding portions, respectively;

a discharge opening in communication with said specimen holding portion;

centrifuge means for spinning said chamber about an axis whereby to cause successive advancement of the specimen and the treatment liquid through said discharge opening onto the collection surface; and liquid receiving means interposed between said radially inner and outer liquid holding portions whereby to receive the treatment liquid from said inner liquid holding portion in response to activation of said centrifuge means as said specimen liquid is advanced from said specimen liquid holding portion through said discharge opening and, upon deactivation of said centrifuge means, permits the treatment liquid to advance by gravity from said liquid receiving means into said specimen holding portion following which activation of said centrifuge means causes the treatment liquid to advance from said specimen holding portion through said discharge opening.

2. The system of claim 1 wherein said holding portions are of vertical elongated configuration and said chamber further comprises a partition between said holding portions and said liquid receiving means.

3. The system of claim 1 wherein means are provided for supporting said cytology chamber in said centrifuge means for tilting about a horizontal axis.

4. A chamber, for use in centrifuging a specimen upon a microscope slide, said chamber being of the type having a specimen holding portion, a mounting flange, and a discharge opening in the flange, and comprising:

a body connected to said mounting flange and having an upper cavity above said specimen holding portion;

means on said body for holding a treatment liquid separately from said upper cavity and said specimen holding portion;

a fluid passage in fluid communication with said upper cavity and said specimen holding portion, said discharge opening being in fluid communication with said specimen holding portion; and centrifuge means for spinning said chamber about an axis causing simultaneous advancement of the specimen liquid from the specimen holding portion into said discharge opening and the treatment liquid from the treatment liquid holding means into said upper cavity.

5. A chamber according to claim 4 wherein said body comprises a body flange connected perpendicularly to said mounting flange and wherein the treatment liquid is free to flow in succession from said upper cavity into said specimen holding portion and from said specimen holding portion into said discharge opening in response to successive deactivation and activation of said centrifuge means.

6. A chamber according to claim 4 wherein said means for holding the treatment liquid comprises a first hollow leg extending downwardly from said upper cavity and in fluid communication with said upper cavity.

7. A chamber according to claim 6 wherein said specimen holding portion comprises:

a lower cavity below said upper cavity; and a second hollow leg extending downwardly in adjoining relation to said first hollow leg.

8. A chamber according to claim 7 wherein said first leg and said second leg each has a longitudinal axis obliquely disposed in relation to said mounting flange.

9. A chamber according to claim 6 wherein said upper cavity comprises:

a retention cove for holding the treatment liquid during centrifugation; and a constricted portion below said retention cove and in fluid communication with said passage.

10. A chamber according to claim 9 wherein said means for holding the treatment liquid further comprises a separation wall separating said first hollow leg from said constricted portion of said upper cavity.

11. In a chamber for containing a specimen for centrifugation in a centrifuge, the chamber having a specimen holding portion, a mounting flange, and a discharge opening in the mounting flange through which a specimen liquid flows from the specimen holding portion by centrifugal force when the centrifuge is activated, the chamber being tiltable between a first position when the centrifuge is at rest and a second position when the centrifuge is activated, an improvement comprising:

means for holding by gravity a treatment liquid separately from the specimen liquid when the chamber is in the first position;

means for holding the treatment liquid by centrifugal force above the specimen holding portion when the chamber is in the second position while the centrifuge is activated; and means for allowing the treatment liquid to fall by gravity into the specimen holding portion when the chamber returns to the first position and the centrifuge is deactivated.

12. The improvement of claim 11 wherein:

said means for holding the treatment liquid separately from the specimen liquid comprises a first upper hollow leg having a closed bottom for holding the treatment liquid;

said means for holding the treatment liquid by centrifugal force above the holding portion comprises a body having an upper cavity therein;

said means for allowing the treatment liquid to fall by gravity to the specimen holding portion comprises a passage extending between said upper cavity and said holding portion; and said first leg and said passage are in separate fluid communication with said upper cavity.

13. The improvement of claim 12 wherein said body comprises a body flange connected perpendicularly to said mounting flange.

14. The improvement of claim 12 wherein said specimen holding portion comprises:

a second hollow leg having a closed bottom for holding a selected one of said liquids; and a lower cavity above said lower leg and in fluid communication with said discharge opening.

15. The improvement of claim 14 wherein said first leg and said second leg each has a longitudinal axis obliquely disposed in relation to said mounting flange.

16. The improvement of claim 12 wherein said upper cavity comprises:

a retention cove; and a constricted portion below said retention cove and in fluid communication with said holding portion.

17. The improvement of claim 16 further comprising a separation wall between said first hollow leg and said constricted portion of said upper cavity.

18. A method of successively applying specimen and treatment liquids onto a collection surface for analysis, comprising:

mounting a chamber having upper and lower liquid holding portions on a centrifuge;

placing each of said specimen and treatment liquids in a different one of said liquid holding portions; and spinning said chamber around the axis of the centrifuge to advance successively said specimen and treatment liquids from each of their respective liquid holding portions.

19. A method according to claim 18 further comprising:

disposing said holding portions in radially inner and outer relation to the axis of the centrifuge; and successively transferring said specimen and treatment liquids from the radially outer holding portion and the radially inner holding portion onto the collection surface.

20. A method according to claim 19 further comprising:

interposing an intermediate receiving portion between the radially inner and radially outer holding portions;

transferring said treatment liquid from the radially inner holding portion into the intermediate holding portion, and simultaneously transferring said specimen liquid from the outer holding portion onto the collection surface by activating the centrifuge a first time;

deactivating the centrifuge to permit said treatment liquid in the intermediate holding portion to fall into the outer holding portion; and activating the centrifuge a second time to transfer said treatment liquid from the outer holding portion onto the collection surface.

21. A method of applying by centrifugation a treatment liquid to a specimen liquid within a centrifuge, by using a sample chamber having a treatment liquid holding portion, a specimen holding portion, a mounting flange, and a discharge opening in the mounting flange through which a liquid flows from the specimen holding portion by centrifugal force when the centrifuge is activated, the chamber being tiltable between a first position when the centrifuge is at rest and a second position when the centrifuge is activated, the method comprising:

activating the centrifuge to advance the specimen liquid through the discharge opening as the treatment liquid is simultaneously advanced from the treatment liquid holding portion to an upper cavity above said specimen holding portion;

deactivating said centrifuge to permit said treatment liquid to advance by gravity from said upper cavity into said specimen holding portion; and reactivating said centrifuge to cause the treatment liquid to advance from said specimen holding portion through said discharge opening.

22. The method of claim 21 further comprising:

mounting in the centrifuge a sample chamber in the first position having:

a first hollow leg having a closed bottom for holding the treatment liquid;

a body having an upper cavity therein; and a fluid passage extending between the upper cavity and the holding portion, wherein the first leg and the passage are in separate fluid communication with the upper cavity;

placing the treatment liquid in the first leg;

depositing the specimen in the holding portion;

activating the centrifuge to tip the sample chamber to the second position;

allowing the treatment liquid to flow by centrifugal force into the upper cavity;

permitting the specimen to flow by centrifugal force through the discharge opening;

deactivating the cytocentrifuge to restore the sample chamber to the first position;

after allowing the treatment liquid to fall by gravity, reactivating the cytocentrifuge to tip the sample chamber to the second position; and allowing the treatment liquid to flow by centrifugal force through the discharge opening.

23. The method of claim 22 wherein mounting a sample chamber comprises mounting a chamber with a holding portion comprising:

a second hollow leg having a closed bottom for holding a liquid;

a lower cavity above the lower leg and in fluid communication with the discharge opening.

24. The method of claim 23 further comprising disposing obliquely in relation to the mounting flange the respective longitudinal axes of the first leg and the second leg.

25. The method of claim 24 wherein mounting the sample chamber further comprises mounting a chamber with the upper cavity comprising:

a retention cove;

a constricted portion below the retention cove and in fluid communication with the holding portion; and a separation wall between the first hollow leg and the constricted portion of the upper cavity.

* * * * *